United States Patent
Borgyos

(10) Patent No.: US 10,170,007 B2
(45) Date of Patent: Jan. 1, 2019

(54) TRAJECTORY AMENDMENT SYSTEM

(71) Applicant: GE Aviation Systems LLC, Grand Rapids, MI (US)

(72) Inventor: Szabolcs Andras Borgyos, Wyoming, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 43 days.

(21) Appl. No.: 15/190,577

(22) Filed: Jun. 23, 2016

(65) Prior Publication Data
US 2017/0372620 A1    Dec. 28, 2017

(51) Int. Cl.
| | |
|---|---|
| *G08G 5/00* | (2006.01) |
| *G08G 5/02* | (2006.01) |
| *G05D 1/10* | (2006.01) |
| *G06Q 10/02* | (2012.01) |
| *G06Q 30/08* | (2012.01) |
| *G06Q 50/14* | (2012.01) |
| *H04B 7/185* | (2006.01) |
| *G06Q 10/04* | (2012.01) |

(52) U.S. Cl.
CPC .......... *G08G 5/0039* (2013.01); *G05D 1/101* (2013.01); *G06Q 10/02* (2013.01); *G06Q 10/047* (2013.01); *G06Q 30/08* (2013.01); *G06Q 50/14* (2013.01); *G08G 5/0021* (2013.01); *G08G 5/02* (2013.01); *H04B 7/18506* (2013.01)

(58) Field of Classification Search
CPC ...... G08G 5/0039; G05D 1/101; G06Q 10/02; G06Q 30/08; G06Q 50/14; G06Q 5/0021

USPC .......................................................... 701/22
See application file for complete search history.

(56) References Cited

U.S. PATENT DOCUMENTS

| | | | |
|---|---|---|---|
| 8,606,491 B2 | 12/2013 | Subbu et al. | |
| 8,818,696 B2 | 8/2014 | Klooster et al. | |
| 9,002,629 B2 | 4/2015 | Struzik | |
| 2006/0173609 A1* | 8/2006 | Green | G01C 21/20 701/120 |

(Continued)

FOREIGN PATENT DOCUMENTS

WO    WO2014/004101 A1    1/2014

OTHER PUBLICATIONS

European Search Report and Opinion issued in connection with related EP Application No. 17177705.5 dated Aug. 17, 2017.

(Continued)

*Primary Examiner* — Yazan A Soofi
(74) *Attorney, Agent, or Firm* — GE Aviation Systems LLC; William Andes

(57) ABSTRACT

Systems and methods for providing trajectory amendments are provided. In one embodiment, a method can include identifying an arrival time slot associated with a landing area. The method can further include providing to one or more second computing devices of a plurality of operators, a first set of data identifying the arrival time slot. The method can include receiving a second set of data indicating that a first operator of the plurality of operators has selected the arrival time slot. The method can further include determining one or more trajectory amendments to allow a first aircraft associated with the first operator to meet the arrival time slot associated with the landing area. The method can include sending one or more trajectory amendments.

20 Claims, 7 Drawing Sheets

(56) References Cited

U.S. PATENT DOCUMENTS

2012/0083946 A1* 4/2012 Maldonado ............ G06Q 10/06
                                                     701/3
2012/0215434 A1   8/2012 Subbu et al.
2012/0215435 A1   8/2012 Subbu et al.
2013/0085661 A1   4/2013 Chan et al.
2014/0277853 A1   9/2014 Castillo-Effen et al.
2014/0343833 A1* 11/2014 Baiada ............... G06Q 10/0631
                                                     701/122
2015/0154873 A1   6/2015 Sawhill et al.

OTHER PUBLICATIONS

European Search Report and Opinion issued in connection with related EP Application No. 17177606.5 dated Aug. 17, 2017.
European Search Report and Opinion issued in connection with corresponding EP Application No. 17177608.1 dated Aug. 17, 2017.
U.S. Notice of Allowance issued in connection with Related U.S. Appl. No. 15/190,599 dated Aug. 18, 2017.
Related U.S. Appl. No. 15/190,559.
Related U.S. Appl. No. 15/190,599.

* cited by examiner

US 10,170,007 B2

TRAJECTORY AMENDMENT SYSTEM

FIELD OF THE INVENTION

The present subject matter relates generally to providing trajectory amendments and more particularly to providing trajectory amendments for selection by an operator.

BACKGROUND OF THE INVENTION

Airlines currently have resources available to collect data and calculate flight trajectory amendments for an aircraft. However, such calculations can involve a significant amount of computational and human resources. This can take away valuable resources that can be allocated to more critical tasks associated with the operation of an aircraft fleet. Moreover, some smaller airlines may not have the same level of access to certain data sources as other, larger airlines. As such, the ability for smaller airlines to calculate advantageous trajectory amendments may be limited.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of providing trajectory amendments. The method can include identifying, by one or more first computing devices, an arrival time slot associated with a landing area. The method can further include providing, by the one or more computing devices to one or more second computing devices of a plurality of operators, a first set of data identifying the arrival time slot. The method can include receiving, by the one or more first computing devices, a second set of data indicating that a first operator of the plurality of operators has selected the arrival time slot. The method can further include determining, by the one or more first computing devices, one or more trajectory amendments to allow a first aircraft associated with the first operator to meet the arrival time slot associated with the landing area. The method can include sending, by the one or more computing devices, the one or more trajectory amendments.

Another example aspect of the present disclosure is directed to a computing system for providing trajectory amendments. The system can include one or more processors and one or more memory devices. The one or more memory devices can store instructions that when executed by the one or more processors cause the one or more processors to perform operations. The operations can include identifying an arrival time slot associated with a landing area. The operations can further include providing for display in a user interface, to one or more second computing devices of a plurality of operators, a first set of data identifying the arrival time slot. The operations can include receiving a second set of data indicating that a first operator of the plurality of operators has selected the arrival time slot. The operations can further include determining one or more trajectory amendments to allow a first aircraft associated with the first operator to meet the arrival time slot associated with the landing area. The operations can include sending the one or more trajectory amendments to one or more operators of the plurality of operators.

Yet another example aspect of the present disclosure is directed to a computing system for providing trajectory amendments. The system can include one or more processors and one or more memory devices. The one or more memory devices can store instructions that when executed by the one or more processors cause the one or more processors to perform operations. The operations can include identifying an arrival time slot associated with a landing area. The operations can further include providing, to one or more second computing devices of a plurality of operators, a first set of data identifying the arrival time slot. The operations can include receiving a second set of data indicating that a first operator of the plurality of operators has selected the arrival time slot. The operations can further include determining one or more trajectory amendments to allow a first aircraft associated with the first operator to meet the arrival time slot associated with the landing area. The operations can include receiving a set of data indicating that a third party entity has accepted the trajectory amendment. The operations can further include sending the one or more trajectory amendments to one or more operators of the plurality of operators.

Other example aspects of the present disclosure are directed to systems, methods, aircrafts, avionics systems, devices, user interfaces, non-transitory computer-readable media for providing trajectory amendments.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
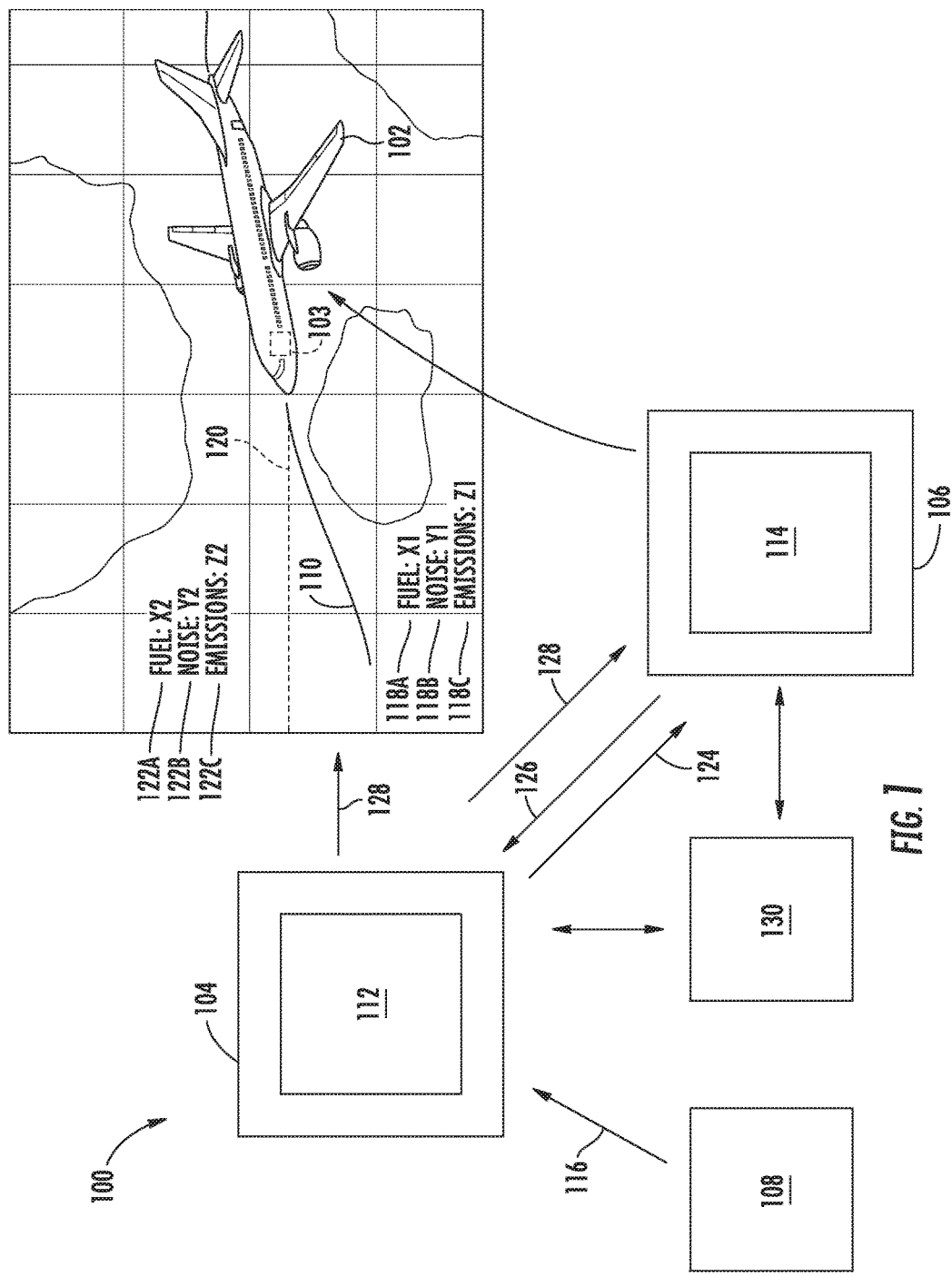
FIG. 1 depicts an example system according to example embodiments of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to system and methods for providing trajectory amendments. For instance, a cloud-based computing system associated with a service provider can identify a current trajectory associated with an aircraft. The computing system can determine a trajectory amendment associated with the aircraft, in real-time. A trajectory amendment can be, for instance, a combination of user defined constraints and/or targets and aircraft performance characteristics captured in a computer that include a deviation (e.g., in speed, altitude, heading, path) from at least a portion of the current trajectory and/or flight plan of the aircraft. The trajectory of an aircraft can be amended by, for example, changing at least one of a flight plan (e.g., constraints on the map, points to traverse), altitude constraints along the flight plan, and/or time/speed constraints along the flight plan. The computing system can determine a projected operations value (e.g., fuel savings, noise savings, emissions savings) and a price associated with the trajectory amendment. The computing system can make the trajectory amendment available for selection (e.g. purchase) by communicating the projected operations value and price of the trajectory amendment to an operator associated with the aircraft. As used herein, an operator can include an airspace user, airline, private operator, business jet operator, UAV operator, etc. In the event that an operator selects (e.g., purchases) the trajectory amendment, the computing system can provide the operator with the details of the trajectory amendment (e.g., change in speed, altitude, heading, path) such that it can implement the trajectory amendment with the aircraft. In this way, the computing system can act as a trajectory amendment brokerage that provides, in real-time, trajectory amendments to operator customers based on market demand as well as operations savings opportunities associated therewith.

More particularly, the computing system of the service provider can identify at least a portion of the current trajectory associated with an aircraft. For instance, the computing system can receive data indicative of the current trajectory from at least one of the aircraft, an operator computing system, one or more data source(s) (e.g., databases associated with aircraft data monitoring entities), and/or another system that can provide such information. The computing system can identify one or more conditions (e.g., speed, heading, altitude, path, time) associated with the current trajectory.

The computing system can determine a trajectory amendment associated with the aircraft in real-time. For instance, the computing system can receive a plurality of parameters associated with the aircraft. The parameters can include weather information, wind shear information, flight traffic information, air traffic rules/constraints, aircraft type, aircraft location information, and/or other types of information associated with the aircraft and/or that can be used to determine a trajectory (or trajectory amendment) associated with the aircraft. The computing system can determine a trajectory amendment associated with the aircraft based, at least in part, on the plurality of parameters (e.g., using a four-dimensional flight trajectory optimization technique). The trajectory amendment can be more cost-effective than at least a portion of the aircraft's current trajectory.

The computing system can determine a projected operations value and/or a price associated with the trajectory amendment. The projected operations value can include a variety of potential operations values. For instance, as further described herein, the projected operations value can include a fuel savings value, a noise savings value, an emissions savings value, a time savings value, and/or a turbulence savings value. Each such value can indicate an amount/level of the fuel, noise, emissions, time, turbulence, etc. The price can be based, at least in part, on the projected demand for the trajectory amendment, the supply of trajectory amendments for the aircraft, the projected operations value, and/or a level of uncertainty/error associated with the trajectory amendment. In some implementations, the computing systems can implement machine learning techniques and/or algorithms to help determine the price associated with the trajectory amendment based, at least in part, on past and/or present activity (e.g., purchasing activity) of the operator. Such techniques can help the service provider determine a market optimized price for the trajectory amendment.

The computing systems can provide the trajectory amendment for selection by an operator. For instance, the computing system can provide, to an operator associated with the aircraft, a set of data identifying the trajectory amendment. Such identification can indicate that the trajectory amendment is available for purchase. The set of data can also be indicative of the projected operations value and/or the price associated with the trajectory amendment. In some implementations, the operations value can be available publically, while the price can be available privately, only to the operator associated with the aircraft. The operator can receive the set of data and display it on a user interface, which can allow the operator to select (e.g., purchase) the trajectory amendment. In some implementations, an air traffic controller can review the trajectory amendment before it is selected by the operator. The air traffic controller can approve, reject, and/or promote the trajectory amendment (e.g., based on the projected operations value), as further described herein, In the event that the operator selects the trajectory amendment, the computing system can send a set of data indicative of the trajectory amendment to the selecting operator. The set of data can include the details of the trajectory amendment such as a change in speed, altitude, heading, path, etc. of the aircraft. The operator can implement the trajectory amendment, for example, by sending the trajectory amendment to the aircraft. Additionally, and/or alternatively, upon selection, the computing system can send the set of data indicative of the trajectory amendment directly to the aircraft (e.g., a flight management system) for implementation.

Other example aspects of the present disclosure are directed to a brokerage system for providing arrival time slots. For instance, the computing system can identify and provide arrival time slots associated with a landing area (e.g., airport) for selection (e.g., purchase) by a plurality of operators. Each of the operators can have an opportunity to select the arrival time slot by submitted a bid to the computing system. The highest bidder can select the trajectory amendment. Upon selection, the computing system can determine one or more trajectory amendments to allow a designated aircraft of the operator to meet the arrival time slot. For example, the computing system can determine a trajectory amendment for the designated aircraft such that it can properly arrive at the arrival time slot. Additionally, and/or alternatively, the computing system can determine one or more trajectory amendment(s) for other aircrafts to prevent the aircrafts from interfering with the designated aircraft meeting the arrival time slot, as further described herein.

The systems and methods according to example aspects of the present disclosure provide cost-efficient trajectory amendments to operator customers in real-time. More particularly, this brokerage-type system can compute, store, and valuate flight trajectory amendments in real-time and provide operations savings opportunities to users, without the need for the service provider to prove the value of the service. Moreover, the systems and methods enable the flight controllers to more easily and effectively ensure safety while affecting airspace noise, congestion, and emissions. In this way, the systems and methods according to example aspects of the present disclosure have a technical effect of encouraging fuel, emissions, noise, etc. minimizing behavior in controlled airspace.

FIG. 1 depicts an example system 100 according to example embodiments of the present disclosure. As shown the system 100 can include an aircraft 102, a computing system 104, an operator computing system 106, and one or more data source(s) 108. As further described herein, the aircraft 102, the computing system 104, the operator computing system 106, and the data source(s) 108 can be configured to communicate with one another (e.g., to send and/or receive data) via one or more networks.

The aircraft 102 can include one or more engine(s), a fuselage, and a flight management system 103. The aircraft 102 can be associated with a current trajectory 110. The flight management system can be configured to implement the current trajectory 110 such that the aircraft 102 can travel according to the trajectory. For instance, the flight management system 103 can implement the current trajectory 110 using the auto-pilot system of the aircraft 102. In some implementations, implementation of the current trajectory 110 can include manual user interaction, for example, by a member of a flight crew. As further described herein, the flight management system 103 can be configured to implement a trajectory amendment associated with the aircraft 102.

The computing system 104 can be, for example, associated with a service provider that makes trajectory amendments available to operators. The computing system 104 can include one or more first computing device(s) 112. The computing device(s) 112 can include various components for performing various operations and functions. For example, and as further described herein, the computing device(s) 112 can include one or more processor(s) and one or more memory device(s). The one or more memory device(s) can store instructions that when executed by the one or more processor(s) cause the one or more processor(s) to perform the operations and functions for providing trajectory amendments, as described herein.

The operator computing system 106 can be associated with an operator that includes the aircraft 102 in the operator's fleet of aircrafts. The operator computing system 106 can be associated with an entity of the operator that is related to and/or responsible for the trajectory management of the operator's aircraft fleet. For instance, the operator computing system 106 can be associated with an operations center (or other entity) that is responsible for monitoring, managing, directing, implementing, etc. the trajectories and/or trajectory amendments for the aircraft 102. The operator computing system 106 can include one or more second computing device(s) 114 of the operator. The second computing device(s) 114 can include various components for performing various operations and functions. For example, the computing device(s) 114 can include one or more processor(s) and one or more memory device(s). The one or more memory device(s) can store instructions that when executed by the one or more processor(s) cause the one or more processor(s) to perform the operations and functions described herein.

The data source(s) 108 can be associated with one or more entities that collect, monitor, and/or store parameters associated with aircrafts (e.g., aircraft 102) and/or avionics systems. For example, the data source(s) 108 can be associated with a weather data center, the federal aviation administration, an air traffic center, an operator operations center, a satellite monitoring system, an individual aircraft, etc. The data source(s) 108 can include one or more computing device(s) that are configured to collect, monitor, and/or store a plurality of parameters 116 associated with an aircraft (e.g., aircraft 102). For instance, the parameters 116 can include weather information, wind shear information, flight traffic information, air traffic rules/constraints, current flight plan and/or trajectory information for an aircraft (e.g., aircraft 102), aircraft performance information, aircraft type, aircraft location information, radar information, voice communication information, publically available information, service-based information, any other information associated with a particular aircraft (e.g., aircraft 102), and/or any other information that may be considered when calculating a trajectory and/or trajectory amendment. The data source(s) 108 can be configured to send the plurality of parameters 116 to the computing device(s) 112 of the computing system 104.

The computing device(s) 112 can be configured to identify at least a portion of the current trajectory 110 associated with the aircraft 102. For instance, the computing device(s) 112 can be configured to receive data indicative of the current trajectory 110 from at least one of the aircraft 102, the operator computing system 106, the data source(s) 108, and/or another system that can provide such information. The computing device(s) 112 can be configured to identify one or more conditions associated with the current trajectory 110. For example, the computing device(s) 112 can be configured to identify a speed, a heading, an altitude, a path, a time, a location, a fuel level, a noise level, an emissions level, etc. associated with at least one or more portion(s) and/or waypoint(s) of the current trajectory 110. By way of example, the computing device(s) 112 can be configured to determine at least one of a first fuel level 118A, a first noise level 118B, and/or a first emissions level 118C associated with the current trajectory 110.

The computing device(s) 112 can be configured to determine a trajectory amendment 120 for the aircraft 102. For instance, the computing device(s) 112 can be configured to receive the plurality of parameters 116 associated with the aircraft 102 from the data source(s) 108. The computing device(s) 112 can be configured to determine the trajectory amendment 120 associated with the aircraft 102 based, at least in part, on the plurality of parameters 116 and/or the current trajectory 110. For example, the computing device(s) 112 can perform a four-dimensional flight trajectory optimization based, at least in part, on the plurality of parameters 116 that are available to the computing device(s) 112. Additionally, and/or alternatively, by using the condition(s) associated with the current trajectory 110, the computing device(s) 112 can be configured to determine the trajectory amendment 120 based, at least in part, on the plurality of parameters 116 such that the trajectory amendment 120 is more cost-effective than the current trajectory 110 associated with the aircraft 102.

The computing device(s) 112 can be configured to determine a projected operations value associated with the trajectory amendment 120. The projected operations value can include at least one of a fuel savings value, a noise savings value, an emissions savings value, a time savings value (e.g., time savings to destination, some other location), a turbulence savings value, and/or another value indicative of an advantage provided by the trajectory amendment 120. In some implementations, the computing device(s) 112 can determine the projected operations value associated with the trajectory amendment 120, based at least in part, on the current trajectory 110 and the trajectory amendment 120. For example, as indicated above, the computing device(s) 112 can be configured to determine at least one of a first fuel level 118A, a first noise level 118B, and/or a first emissions level 118C associated with the current trajectory 110. The computing device(s) 112 can also be configured to determine at least one of a second fuel level 122A, a second noise level 122B, and/or a second emissions level 122C associated with the trajectory amendment 120. The computing device(s) 112 can be configured to determine the projected operations value associated with the trajectory amendment 120 based, at least in part, on at least one of a difference between the first fuel level 118A and the second fuel level 122A, a difference between the first noise level 118B and the second noise level 122B, and a difference between the first emissions level 118C and the second emissions level 122C.

The computing device(s) 112 can be configured to determine a price associated with the trajectory amendment 120. For example, the computing device(s) 112 can be configured to determine the price based, at least in part, on the projected demand for the trajectory amendment 120, the supply of trajectory amendments for the aircraft 102, the projected operations value, and/or a level of uncertainty associated with the trajectory amendment 120 (e.g., error in projected operations value). The price can be specific to the operator. Additionally, and/or alternatively, the computing device(s) 112 can be configured to implement machine learning techniques and/or algorithms to help determine the price associated with the trajectory amendment 120 based, at least in part, on past and/or present activity (e.g., purchasing activity) of the operator. In this way, the computing device(s) 112 can be configured to find a market optimized price for the trajectory amendment 120.

The computing device(s) 112 can be configured to provide, to the other computing device(s) 114, a set of data 124 identifying the trajectory amendment 120. For example, identification of the trajectory amendment 120 can include indicating that the trajectory amendment 120 is available for selection (e.g., purchase). The set of data 124 can also, and/or alternatively, indicate the price associated with the trajectory amendment 120 and/or the projected operations value associated with the trajectory amendment 120. For instance, the computing device(s) 112 can be configured to generate an output indicating that the trajectory amendment 120 is available, the aircraft 102, the projected operations value, and/or the price associated with the trajectory amendment 120. The computing device(s) 112 can be configured to send the output to the computing device(s) 114 of the operator associated with the aircraft 102 for display via a user interface.

Figure 2:
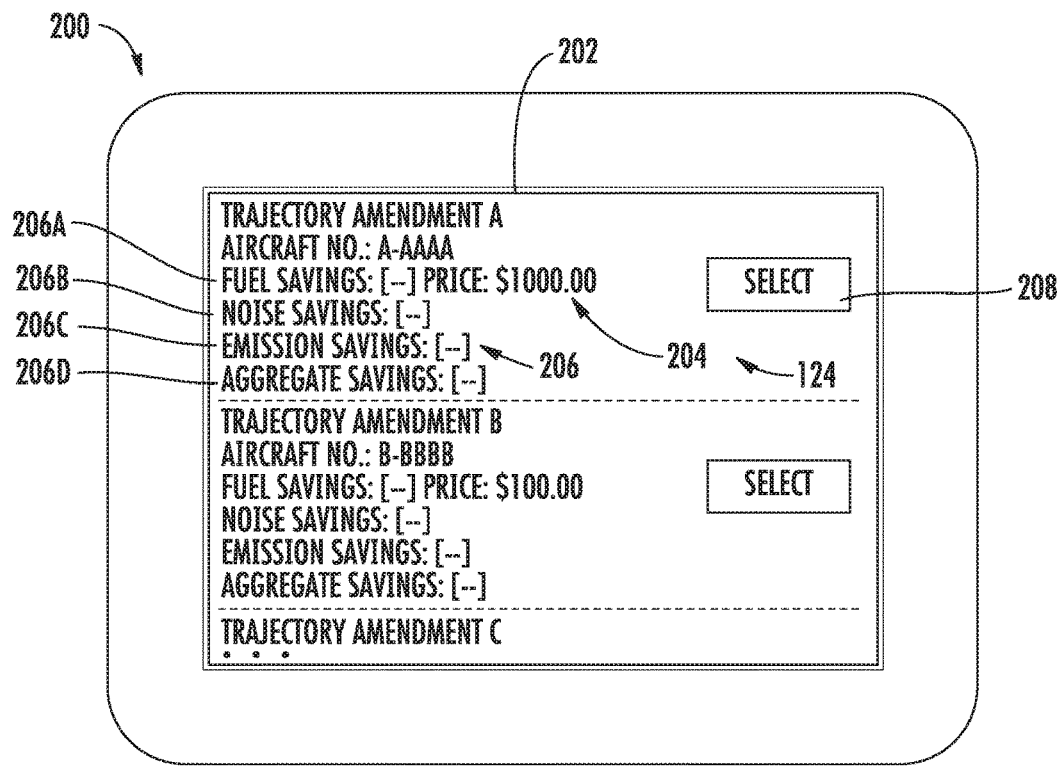
FIG. 2 depicts an example user interface according to example embodiments of the present disclosure.

For example, FIG. 2 depicts an example user interface 200 according to example embodiments of the present disclosure. The user interface 200 can be displayed on a display device associated with the computing device(s) 114. As shown in FIG. 2, an output 202 including the set of data 124 can be displayed via the user interface 200. For example, the user interface 200 can identify the trajectory amendment 120 (e.g., "TRAJECTORY AMENDMENT A"), the aircraft 102 associated with the trajectory amendment 120 (e.g., "AIRCRAFT NO. A-AAAA"), the price 204 (e.g., $1000.00), and/or the projected operations value 206. The price 204 can be private to the operator, such that only the operator can view the price 204 associated with the trajectory amendment 120.

The projected operations value 206 can include a variety of potential operations values. For instance, as shown, the projected operations value 206 can include at least one of a fuel savings value 206A, a noise savings value 206B, and/or an emissions savings value 206C. The projected operations value 206 can also, and/or alternatively, include a time operations value. In some implementations, the user interface 200 will not display a savings value in terms of currency associated with the trajectory amendment 120. Moreover, in some implementations, the projected operations value 206 can be made publically available, such that other operators can view the projected operations value 206 associated with the trajectory amendment 120.

In some implementations, the projected operations value 206 can include an aggregate operations value 206D. The aggregate operations value 206D can be indicative of the agreement amount of savings the operator has experienced by selecting (e.g., purchasing) trajectory amendments from the provider associated with the computing device(s) 112 over a certain time period (e.g., day, month, year, all time). The aggregate operations value 206D can be indicated in terms of fuel, noise, emissions, time, etc. In some implementations, the aggregate operations value 206D can include the projected operations value 206 associated with the trajectory amendment 120, while in some implementations the aggregate operations value 206D can include only the operations values associated with trajectory amendments that have been previously selected by the operator. In this way, the user interface 200 can indicate to the operator the amount that the operator has saved by selecting trajectory amendments from the provider and/or the amount the aggregate savings will further increase by selecting the trajectory amendment 120. It should be noted that while the price 204, the projected operations value 206, etc. are displayed for the operator at this pre-selection stage, the parameters of the trajectory amendment 120 are not displayed prior to selection of the trajectory amendment 120.

The user interface 200 can allow for a selection of the trajectory amendment 120. For example, as shown in FIG. 2, the user interface 200 can include an interactive element 208 (e.g., button, entry field, menu) with which a user of the computing device(s) 114 of the operator can interact with to select the trajectory amendment 120. Selecting the trajectory amendment 120 can include purchasing the trajectory amendment 120. In some implementations, the computing device(s) 114 can be configured to automatically select the trajectory amendment 120 in the event that the trajectory amendment 120 meets one or more limits (e.g., price limit, projected savings limit). These limits can be, for example, set by the operator and/or a user associated therewith.

Returning to FIG. 1, upon selection of the trajectory amendment 120, the computing device(s) 114 can send a second set of data 126 indicating that the operator has selected the trajectory amendment 120. The computing device(s) 112 can be configured to receive the second set of data 126 indicating that the operator (associated with the aircraft 102) has selected the trajectory amendment 120. The computing device(s) 112 can be configured to send a third set of data 128 indicative of the trajectory amendment 120 in real-time. The third set of data 128 can indicate one or more second parameters (further described below) associated with the trajectory amendment 120. In some implementations, the computing device(s) 112 can send the third set of data 128 to the aircraft 102 (e.g., to the flight management system). In this way, the aircraft 102 can implement the trajectory amendment 120. For example, a flight crew member of the aircraft 102 can interact with the flight management system 103 and/or other control systems to implement the trajectory amendment 120. Additionally, and/or alternatively, the flight management system 103 of the aircraft 102 can implement at least a portion of the trajectory amendment 120 with the auto-pilot system of the aircraft 102.

In some implementations, the computing device(s) 112 can be configured to send the third set of data 128 indicating one or more second parameters associated with the trajectory amendment 120 to the one or more second computing device(s) 114 of the operator associated with the aircraft 102. The third set of data 128 can then be displayed via a user interface to show the second parameters associated with the trajectory amendment 120 to the operator (and/or a user associated therewith).

Figure 3:
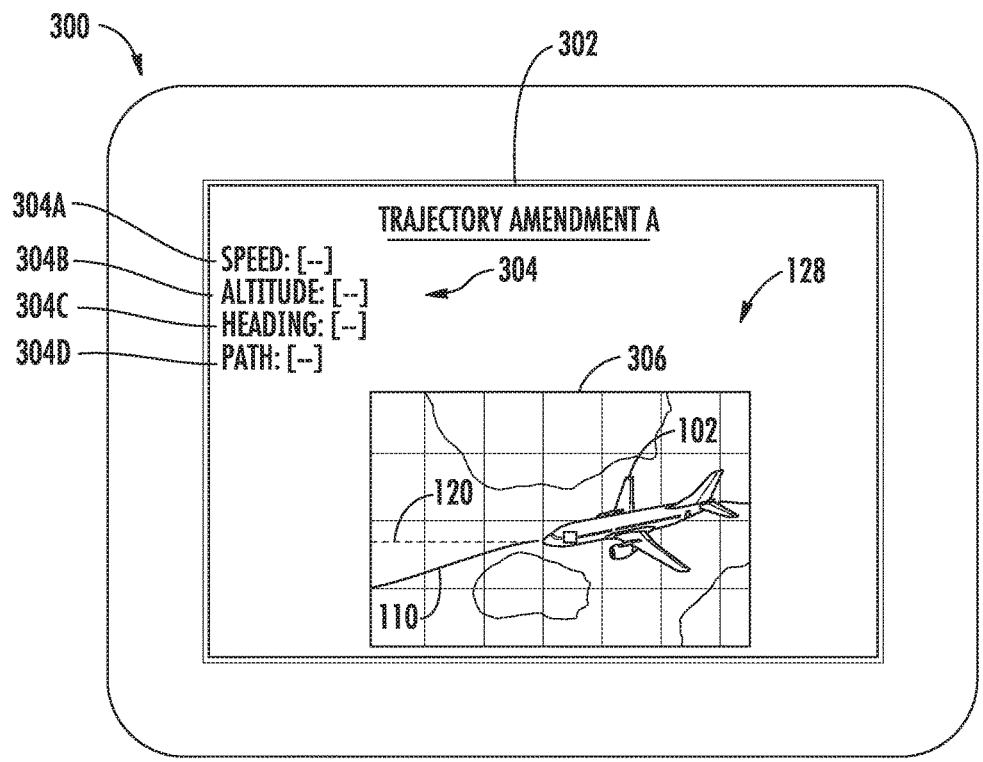
FIG. 3 depicts an example user interface according to example embodiments of the present disclosure.

For example, FIG. 3 depicts an example user interface 300 according to example embodiments of the present disclosure. The computing device(s) 114 of the operator can display an output 302 including the third set of data 128 via the user interface 300. As shown in FIG. 3, the third set of data 128 can be indicative of the second parameters 304 of the trajectory amendment 120 (e.g., the details of the trajectory amendment 120). For instance, the second parameters 304 can include least one of a speed change 304A associated with the aircraft 102, an altitude change 304B associated with the aircraft 102, a heading change 304C associated with the aircraft 102, and/or a path change 304D associated with the aircraft 102. In some implementations, the parameters 304 are made available to the operator only after selection (e.g., purchase) of the trajectory amendment 120. Additionally, and/or alternatively, the user interface 300 can display a graphical representation 306 of the current trajectory 110 and/or the trajectory amendment 120.

The computing device(s) 114 of the operator can be configured to implement the trajectory amendment 102. For example, computing device(s) 114 can send data indicative of the trajectory amendment 120 to the aircraft 102. The aircraft 102 can be configured to implement the trajectory amendment 120. For example, a flight crew member of the aircraft 102 can interact with the flight management system 103 and/or other control systems to implement the trajectory amendment 120. Additionally, and/or alternatively, the flight management system 103 of the aircraft 102 can implement at least a portion of the trajectory amendment 120 via the auto-pilot system of the aircraft 102.

Returning to FIG. 1, in some implementations, the trajectory amendment 120 can be received and/or reviewed by a third party entity 130. For example, the third part entity can be associated with an administrative agency, government agency, air traffic control entity, etc. The computing device(s) 112 can send data indicative of the trajectory amendment 120 (e.g., sets of data 124, 126, 128) to the third party entity 130 for approval. The third party entity 130 (e.g., air traffic control entity) can receive data indicative of the trajectory amendment 120 (e.g., sets of data 124, 126, 128) to review the trajectory amendment 120. Such review can take place before the trajectory amendment 120 is identified to the operator, while the trajectory amendment 120 is available for selection, and/or before the trajectory amendment 120 is implemented. In this way, the third party entity 130 (e.g., air traffic control entity) can review the parameters 304 of the trajectory amendment 120 to evaluate the safety and/or effects (e.g., fuel, noise, emissions, time, turbulence savings) of the trajectory amendment 120. The third party entity 130 can accept or reject the trajectory amendment 120 (e.g., in whole or in part) depending, at least in part, on whether it approves or disapproves of the parameters 304 and/or effects of the trajectory amendment 1201$n$ the event that the trajectory amendment 120 is accepted by the third party entity 130 (e.g., by action and/or inaction by the third party entity 130), the trajectory amendment 120 will be made available (and/or continue being available) for selection. If the trajectory amendment 120 is rejected by the third party entity 130 (e.g., by action and/or inaction by the third party entity 130), the trajectory amendment 120 will not be made available (and/or cease being available) for selection.

In some implementations, the third party entity 130 can promote the trajectory amendment 120. For example, the third party entity 130 may wish to promote fuel, noise, and/or emissions savings. In the event that the trajectory amendment 120 is associated with a second fuel level 122A, a second noise level 122B, and/or a second emissions level 122C and/or the savings levels are above a threshold level, the third party entity 130 can be configured to subsidize the price 204 of the trajectory amendment 120. In this way, the third party entity 130 can encourage the selection of the trajectory amendment 120 to promote certain savings associated with the trajectory amendment 120.

Figure 4:
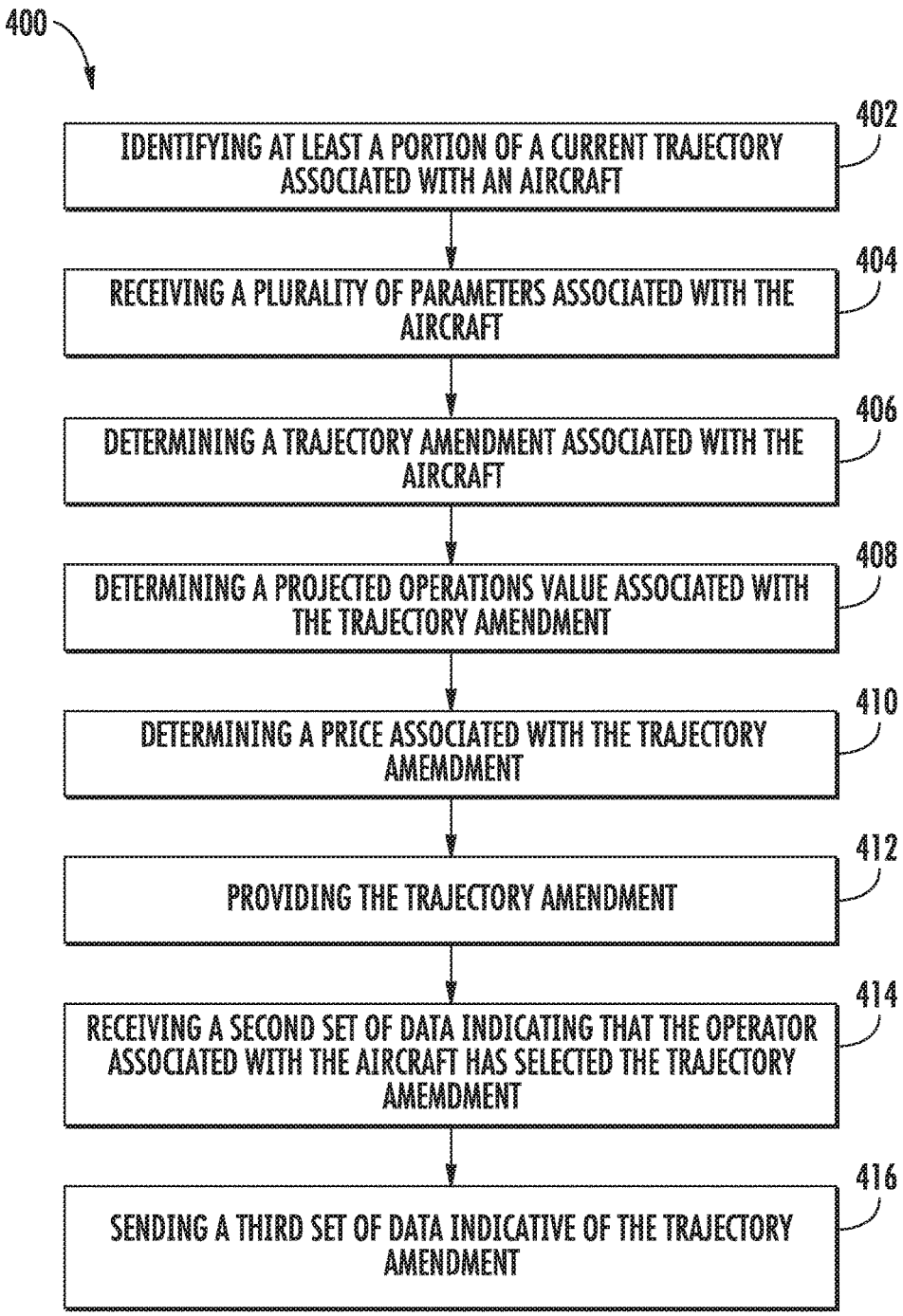
FIG. 4 depicts a flow diagram of an example method for providing trajectory amendments according to example embodiments of the present disclosure.

FIG. 4 depicts a flow diagram of an example method 400 for providing trajectory amendments according to example embodiments of the present disclosure. FIG. 4 can be implemented by one or more computing device(s), such as the computing device(s) depicted in FIGS. 1 and 8. One or more step(s) of the method 400 can be performed while aircraft 102 is in-flight. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged, and/or omitted in various ways without deviating from the scope of the present disclosure.

At (402), the method 400 can include identifying at least a portion of a current trajectory associated with an aircraft. For instance, the computing device(s) 112 can identify at least a portion of the current trajectory 110 associated with the aircraft 102. The computing device(s) 112 can receive data indicative of the current trajectory 110 from at least one of the aircraft 102, the operator computing system 106, the data source(s) 108, and/or another system that can provide such information. The computing device(s) 112 can identify one or more conditions (e.g., speed, heading, altitude, path, time) associated with the current trajectory 110, as described above.

At (404), the method 400 can include receiving a plurality of parameters associated with the aircraft. For example, the computing device(s) 112 can receive a plurality of parameters 116 associated with the aircraft 102. The parameters 116 can be received from the data source(s) 108, the second computing device(s) 114 of the operator, and/or the aircraft 102. As indicated above, the parameters 116 can include various types of information that can be associated with the aircraft 102 and/or can be used to determine a trajectory (or trajectory amendment) associated with the aircraft 102.

At (406), the method 400 can include determining a trajectory amendment associated with the aircraft. For instance, the computing device(s) 112 can determine a trajectory amendment 120 associated with the aircraft 102 based, at least in part, on the plurality of parameters 116. In some implementations, the computing device(s) 112 can perform a four-dimensional flight trajectory optimization based, at least in part, on the plurality of parameters 116 to determine the trajectory amendment 120 associated with the aircraft 102. The trajectory amendment can include one or more second parameters 304 that can include at least one of a speed change 304A associated with the aircraft 102, an altitude change 304B associated with the aircraft 102, a heading change 304C associated with the aircraft 102, and/or a path change 304D associated with the aircraft 102. The changes can be relative to the conditions (e.g., speed, altitude, heading, path) associated with one or more portion(s) of the current trajectory 110.

Additionally, and/or alternatively, the computing device(s) 112 can determine a trajectory amendment 120 associated with the aircraft 102 based, at least in part, on the current trajectory 110. For example, as indicated above, the computing device(s) 112 can identify at least a portion of the current trajectory 110 associated with the aircraft 102 and/or one or more conditions associated therewith. By using the condition(s) identified for the current trajectory 110, the computing device(s) 112 can determine the trajectory amendment 120 such that the trajectory amendment 120 is more cost-effective than the current trajectory 110 associated with the aircraft 102.

At (408), the method 400 can include determining a projected operations value associated with the trajectory amendment. For instance, the computing device(s) 112 can determine a projected operations value 206 associated with the trajectory amendment 120. The projected operations value 206 can include a variety of potential operations values. For instance, as indicated above, the projected operations value 206 can include at least one of a fuel savings value 206A, a noise savings value 206B, an emissions savings value 206C, and/or an aggregate savings value 206D. The projected operations value 206 can also, and/or alternatively, include a time savings value and/or a turbulence savings value.

In some implementations, the computing device(s) 112 can determine the projected operations value 206 by calculating a difference in levels associated with the current trajectory 110 and the trajectory amendment 120. For example, the computing device(s) 112 can determine at least one of a first fuel level 118A, a first noise level 118B, and/or a first emissions level 118C associated with the current trajectory 110. The computing device(s) 112 can determine at least one of a second fuel level 122A, a second noise level 122B, and a second emissions level 122C associated with the trajectory amendment 120. The computing device(s) 112 can determine the projected operations value 206 associated with the trajectory amendment 120 based, at least in part, on at least one of a difference between the first fuel level 118A and the second fuel level 122A, a difference between the first noise level 118B and the second noise level 122B, and a difference between the first emissions level 118C and the second emissions level 122C.

At (410), the method can include determining a price associated with the trajectory amendment. For instance, the computing device(s) 112 can determine a price 204 associated with the trajectory amendment 120. In some implementations, the computing device(s) 112 can determine the price based, at least in part, on the projected demand for the trajectory amendment 120, the supply of trajectory amendments for the aircraft 102, the projected operations value 206, and/or a level of uncertainty/error associated with the trajectory amendment 120. The computing device(s) 112 can implement machine learning techniques and/or algorithms to help determine the price 204 associated with the trajectory amendment 120 based, at least in part, on past and/or present activity (e.g., purchasing activity) of the operator. Such techniques can help the provider associated with the computing device(s) 112 determine a market optimized price for the trajectory amendment 120.

At (412), the method can include providing the trajectory amendment 120. For instance, the computing device(s) 112 can provide, to the one or more second computing device(s) 114 of an operator associated with the aircraft 102, the set of data 124 identifying the trajectory amendment 120. For example, the set of data 124 can indicate that the trajectory amendment 120 is available for purchase. The set of data 124 can also be indicative of the projected operations value 206 and/or the price 204 associated with the trajectory amendment 120. For example, the computing device(s) 112 can generate an output 202 indicating that the trajectory amendment 120 is available, the aircraft 102, the projected operations value 206, and/or the price 204. The computing device(s) 112 can send the output 202 to the one or more second computing device(s) 114 of the operator associated with the aircraft 102 for display via the user interface 200. As described above, the user interface 200 can allow for a selection of the trajectory amendment 120. The computing device(s) 114 can receive the output 202 and display it via the user interface 200.

In some implementations, the set of data 124 can omit the second parameters 304 of the trajectory amendment 120. For instance, as indicated above, the second parameters 304 can be indicative of at least one of the speed change 304A associated with the aircraft 102, the altitude change 304B associated with the aircraft 102, the heading change 304C associated with the aircraft 102, and/or the path change 304D associated with the aircraft 102. However, in some implementations, the set of data 124 is not indicative of the second parameters 304 (e.g., the speed change 304A associated with the aircraft 102, the altitude change 304B associated with the aircraft 102, the heading change 304C associated with the aircraft 102, and/or the path change 304D associated with the aircraft 102). Concealment of the second parameters 304 of the trajectory amendment 120 at the pre-selection stage can provide further incentive for the operator to select the trajectory amendment 120. Upon selection of the trajectory amendment 120, the computing device(s) 114 can send the second set of data 126 indicating that the operator selected the trajectory amendment 120.

At (414), the method can include receiving a second set of data indicating that the operator associated with the aircraft has selected the trajectory amendment. For instance, the computing device(s) 112 can receive the second set of data 126 indicating that the operator associated with the aircraft 102 has selected the trajectory amendment 120. By way of example, the operator (e.g., a user associated therewith) can interact with the interactive element 208 of the user interface 200 to select (e.g., purchase) the trajectory amendment 120.

At (416), the method can include sending a third set of data indicative of the trajectory amendment. For instance, as indicated above, the computing device(s) 112 can send the third set of data 128 (e.g., indicating one or more second parameter(s) 304 associated with the trajectory amendment 120) to the one or more second computing device(s) 114 of the operator associated with the aircraft 102. This can occur after the trajectory amendment 120 is selected by the operator. The computing device(s) 114 of the operator can receive the third set of data 128 and display the third set of data 128 via the user interface 300 to show the second parameters 304 of the trajectory amendment 120 to the operator (and/or operators thereof). As indicative above, the second parameters 304 can be made available to the operator after selection (e.g., purchase) of the trajectory amendment 120. The computing device(s) 114 of the operator can implement the trajectory amendment 102, for example, by sending data indicative of the trajectory amendment 120 to the aircraft 102.

Additionally and/or alternatively, the computing device(s) 112 can send the third set of data 128 indicating one or more second parameter(s) associated with the trajectory amendment 120 directly to the aircraft 102 such that the aircraft 102 can implement the trajectory amendment 120 (e.g., via the flight management system 103 of the aircraft 102). In some implementations, this can be done without sending the third set of data 126 to the computing device(s) 114 of the operator.

In some implementations, the method 400 can include sending the trajectory amendment for approval. For instance, the computing device(s) 112 can send data indicative of the trajectory amendment 120 (e.g., sets of data 124, 126, 128) to the third party entity 130 for approval. The third party entity 130 (e.g., air traffic control entity) can receive the data indicative of the trajectory amendment 120 and review the second parameters 304 of the trajectory amendment 120, as described above. The third party entity 130 can accept or reject the trajectory amendment 120 depending, at least in part, on whether it approves or disapproves of the second parameters 304 and/or effects (e.g., projected operations value, fuel, noise, emissions savings) of the trajectory amendment 120.

In some implementations, the method 400 can include receiving data indicative of the acceptance or rejection of the trajectory amendment. For instance, the computing device(s) 112 can receive a set of data indicating that the third party entity 130 has rejected or accepted the trajectory amendment 120. For example, the third party entity 130 can accept the trajectory amendment 120 (e.g., by action and/or inaction by the third party entity 130) and send a set of data indicating that the third party entity 130 accepts the trajectory amendment 120. The computing device(s) 112 can receive such data and provide (or continue to provide) the trajectory amendment 120. The third party entity 130 can reject the trajectory amendment 120 (e.g., by action and/or inaction by the third party entity 130) and send a set of data indicating that the third party entity rejects the trajectory amendment 120. The computing device(s) 112 can receive such data and not provide (or cease to provide) the trajectory amendment 120.

Additionally, and/or alternatively, the method 400 can include receiving data indicative of a promotion of the trajectory amendment. The third party entity 130 can decide to promote the trajectory amendment 120 due to, for example, the projected operations value 206 associated with the trajectory amendment 120. The third party entity 130 can send a set of data to the computing device(s) 112 indicating that the third party entity promotes the trajectory amendment 120. By way of example, such a set of data can indicate that the third party entity wishes to subsidize the price 204 of the trajectory amendment 120. The computing device(s) 112 can receive this set of data from the third party entity 130 and send the set of data 124 (e.g., to the computing device(s) 114 of the operator) indicating that the trajectory amendment 120 is available, a subsidized price, an operations value, and/or an indication of an approval and/or promotion of the trajectory amendment 120 by the third party entity 130.

Figure 5:
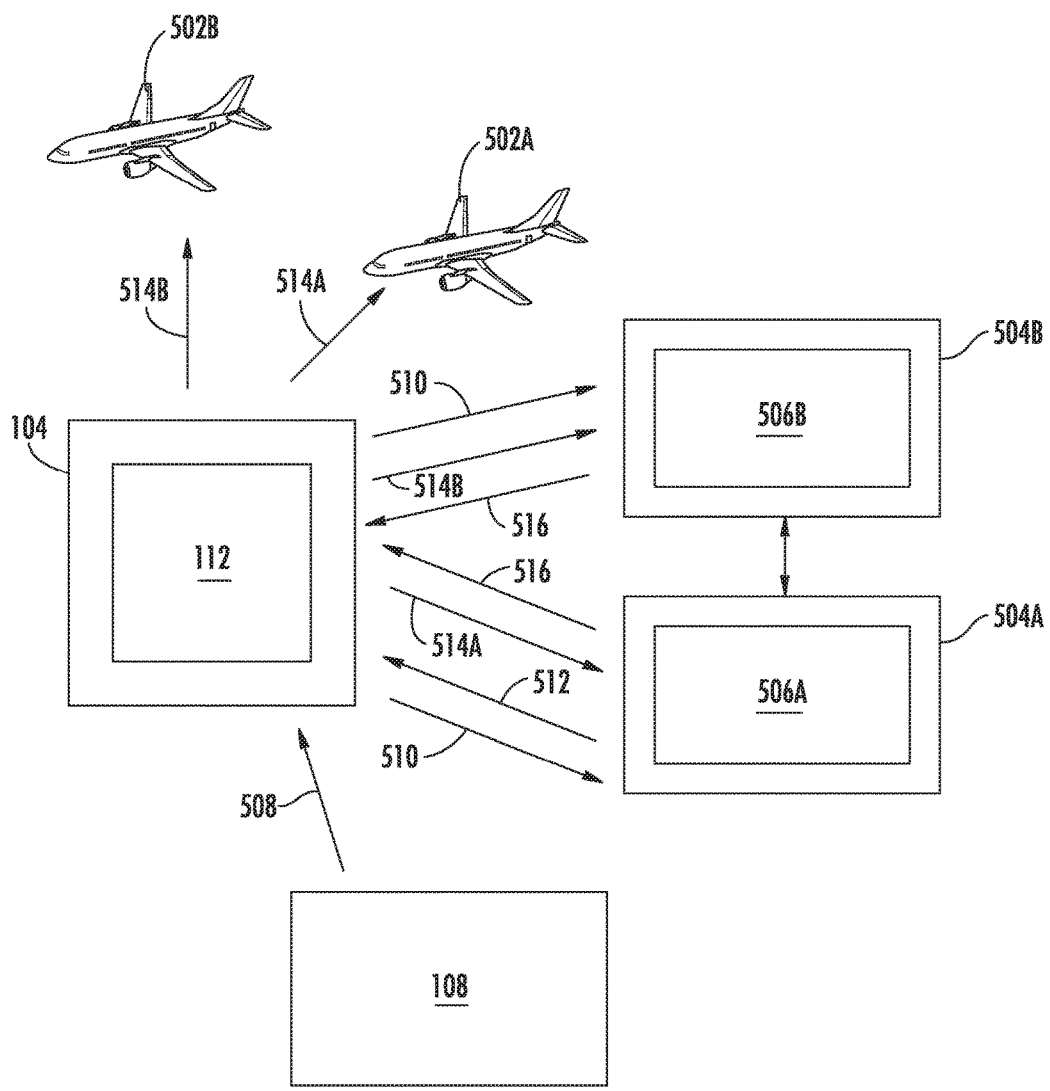
FIG. 5 depicts an example system according to example embodiments of the present disclosure.

FIG. 5 depicts an example system 500 according to example embodiments of the present disclosure. As shown, the system 500 can include a plurality of aircrafts 502A-B, the computing system 104 (including computing device(s) 112), data source(s) 507, and a plurality of computing systems 504A-B (e.g., including computing device(s) 506A-B) each associated with a different operator. As further described herein, the aircraft 102, the plurality of aircrafts 502A-B, the computing system 104, the data source(s) 1507, and the plurality of computing systems 504A-B can be configured to communicate with one another (e.g., to send and/or receive data) via one or more networks.

The computing device(s) 112 can be configured to provide arrival time slots via a bidding-type system. For example, the computing device(s) 112 can be configured to identify an arrival time slot associated with a landing area (e.g., airport). The arrival time slot can be a time that is available for an aircraft to arrive at (e.g., within the vicinity of) the landing area. The data sources 507 can be associated with one or more entities (e.g., air traffic control, airports) that collect, monitor, and/or store information associated with arrival time slots. The computing device(s) 112 can be configured to identify the arrival time slot by, for example, receiving a set of data 507 indicative of the arrival time slot from the data sources 108.

The computing device(s) 112 can be configured to provide, to one or more second computing device(s) 506A-B of a plurality of operators, a first set of data 510 identifying that the arrival time slot is available. This can include indicating that the arrival time slot is available for purchase. The computing device(s) 112 can provide the first set of data 510 to the computing device(s) 506A of a first operator and to the computing device(s) 506B of a second operator. The arrival time slot can be selected (e.g., purchased) by the first or second operator by bidding on the arrival time slot through a user interface.

Figure 6:
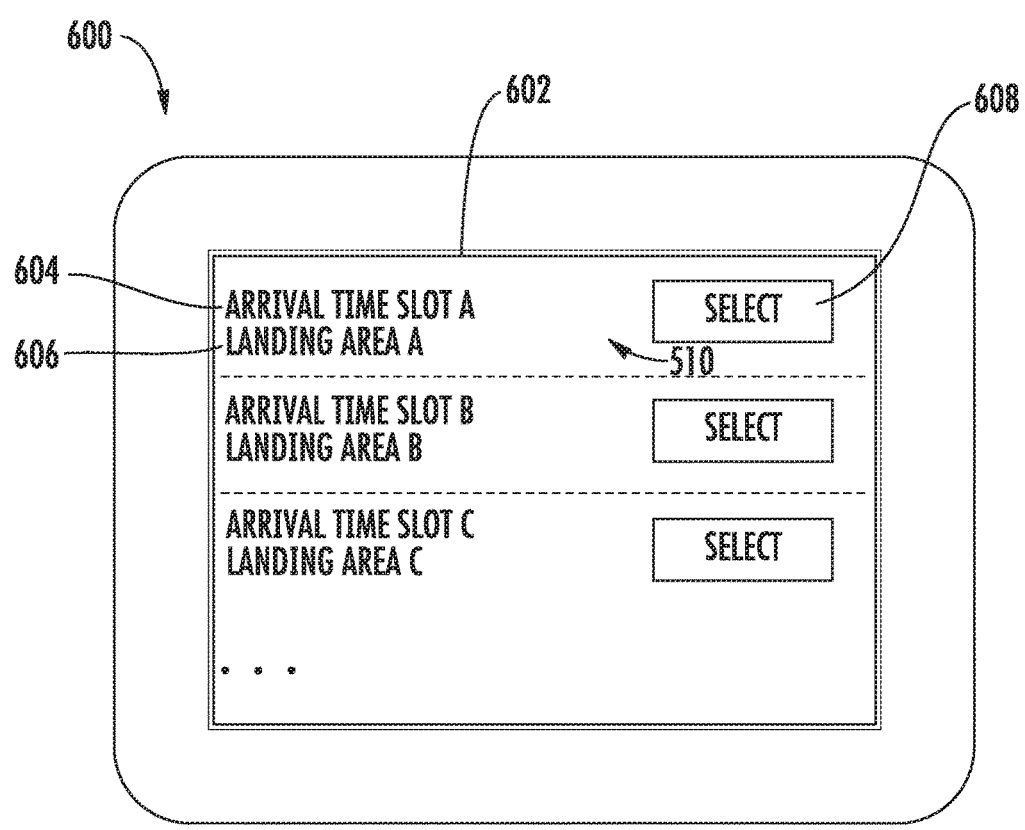
FIG. 6 depicts an example user interface according to example embodiments of the present disclosure.

For example, FIG. 6 depicts an example user interface 600 according to example embodiments of the present disclosure. The computing device(s) 506A-B of a first and second operators can be configured to receive the first set of data 510 and display an output 602 that is indicative of the arrival time slot 604 (e.g., "ARRIVAL TIME SLOT A"). The first set of data 510 can also indicate the landing area 606 (e.g., "LANDING AREA A") associated with the arrival time slot 604 and this information can be displayed on the user interface 600.

In some implementations, each of the plurality of operators is able to select the arrival time slot 604 by submitting a bid to the one or more computing device(s) 112. In some implementations, the user interface 600 can include an interactive element 608 (e.g., button, entry field, menu) with which a user of the computing device(s) 506A-B can interact to bid on the arrival time slot 604. By way of example, the first operator and/or second operator can submit a bid for the arrival time slot 604 by interacting with the interactive element 608. At the end of a time period (e.g., auction time period), the operator with the highest bid can select (e.g., purchase) the arrival time slot 604. For example, in the event that the first operator has a higher bid than the second operator, the first operator will select the arrival time slot 604.

The computing device(s) 112 can be configured to receive an indication that the arrival time slot 604 has been selected. For instance, upon selection of the arrival time 604, the computing device(s) 506A of the first operator can be configured to send the second set of data 512 indicating that the first operator has selected the arrival time slot 604. The computing device(s) 112 can be configured to receive the second set of data 512 indicating that the first operator (of the plurality of operators) has selected the arrival time slot 604 (e.g., via the user interface 600).

The computing device(s) 112 can be configured to determine one or more trajectory amendments to allow a first aircraft 502A associated with the first operator (e.g., that selected the arrival time slot 604) to meet the arrival time slot 604 associated with the landing area 606. For instance, in a manner similar to that described above, the computing device(s) 112 can receive a plurality of parameters from the data source(s) 108. Based, at least in part, on the plurality of parameters, the computing device(s) 112 can determine one or more trajectory amendments 514A-B associated with one or more aircrafts 502A-B.

In some implementations, at least one of the trajectory amendments 514A-B can be associated with a first aircraft 502A of the first operator (e.g., that selected the arrival time slot). For example, a first trajectory amendment 514A can be associated with the first aircraft 502A and can include one or more parameters (e.g., a change in speed, altitude, heading, path) to allow the first aircraft 502A to meet the arrival time slot 604 associated with the landing area 606. The computing device(s) 112 can send the first trajectory amendment 514A to the aircraft 502A and/or the computing device(s) 506A for implementation of the trajectory amendment 514A, in a manner similar to that described above.

In some implementations, one or more of the trajectory amendments 514A-B can be associated with aircrafts (e.g., 502B) of one or more operators other than the first operator. For example, a second trajectory amendment 514B can be associated with the second aircraft 502B of the second operator that did not select the arrival time slot. The second trajectory amendment 514B can include one or more parameters (e.g., a change in speed, altitude, heading, path) to prevent the second aircraft 502B from obstructing the first aircraft 502A from meeting the arrival time slot 604 associated with the landing area 606. The computing device(s) 112 can be configured to send the second trajectory amendment 514B to the computing device(s) 506B associated with the second operator. The computing device(s) 112 can be configured to incentivize the second operator to implement the second trajectory amendment 514B, for example, by paying the second operator. In such case, the profit to the provider can include the difference between the bid price paid by the first operator and the cost to sell the second trajectory amendment 514B to the second operator.

In some implementations, the computing device(s) 112 can send the trajectory amendment(s) 514A-B for approval. For instance, the computing device(s) 112 can send data indicative of the trajectory amendment 514A-B to the third party entity 130 for approval. The third party entity 130 can receive the data indicative of the trajectory amendment 514A-B and review the parameters of the trajectory amendment 514A-B, in a manner similar to that described above. The third party entity 130 can accept or reject the trajectory amendment 514A-B (in whole or in part) depending, at least in part, on whether it approves or disapproves of the parameters and/or effects (e.g., projected operations value, fuel, noise, emissions savings) of the trajectory amendment 514A-B.

In some implementations, the computing device(s) 112 can receive data indicative of the acceptance or rejection of the trajectory amendment. For instance, the computing device(s) 112 can receive a set of data indicating that the third party entity 130 has rejected or accepted the trajectory amendment 514A-B. For example, the third party entity 130 can accept the trajectory amendment 514A-B (e.g., by action and/or inaction by the third party entity 130) and send a set of data indicating that the third party entity 130 accepts the trajectory amendment 514A-B. The computing device(s) 112 can receive such data and provide (or continue to provide) the trajectory amendment 514A-B. The third party entity 130 can reject the trajectory amendment 514A-B (e.g., by action and/or inaction by the third party entity 130) and send a set of data indicating that the third party entity rejects the trajectory amendment 514A-B. The computing device(s) 112 can receive such data and not provide (or cease to provide) the trajectory amendment 514A-B.

Additionally, and/or alternatively, the computing device(s) 112 can receive data indicative of a promotion of the trajectory amendment. The third party entity 130 can decide to promote the trajectory amendment 514A-B due to, for example, a projected operations value associated with the trajectory amendment 514A-B. The third party entity 130 can send a set of data to the computing device(s) 112 indicating that the third party entity 130 promotes the trajectory amendment 514A-B. Additionally, and/or alternatively, the set of data indicating that the third party entity 130 has accepted the trajectory amendment can include an indication that the third party 130 promotes the trajectory amendment 514A-B.

By way of example, the third part entity 103 may wish to promote the second trajectory amendment 514B because it is associated with a fuel, noise, emissions, turbulence, etc. savings. As such, the third party entity 130 can promote the second trajectory amendment 514B by incentivizing (e.g., paying, give priority treatment, etc.) the second operator to implement the second trajectory amendment 514B. The computing device(s) 112 can receive a set of data from the third party entity 130 indicating that a third party entity has accepted the trajectory amendment and/or including an indication that the third party promotes the trajectory amendment. The computing devices can send a set of data indicating the trajectory amendment 512B, an operations value, an indication of an approval, and/or an indication of a promotion of the trajectory amendment 514B by the third party entity 130 to one or more operators of the plurality of operators (e.g., to the computing device(s) 506A-B of the operator(s)).

In some implementations, the operators can transfer the arrival time slots. For example, the first operator can transfer the arrival time slot 604 to the second operator. The computing device(s) 506A-B of the first and/or second operators can be configured to send a third set of data 516 indicating that the first operator has transferred the arrival time slot 604 to a second operator. The computing device(s) 112 can be configured to receive the third set of data 516 indicating that the first operator has sold the arrival time slot 604 to a second operator. The computing device(s) 112 can be configured to determine one or more other trajectory amendments to allow a second aircraft 502B associated with the second operator to meet the arrival time slot 604 associated with the landing area 606, in a manner similar to that described above.

Figure 7:
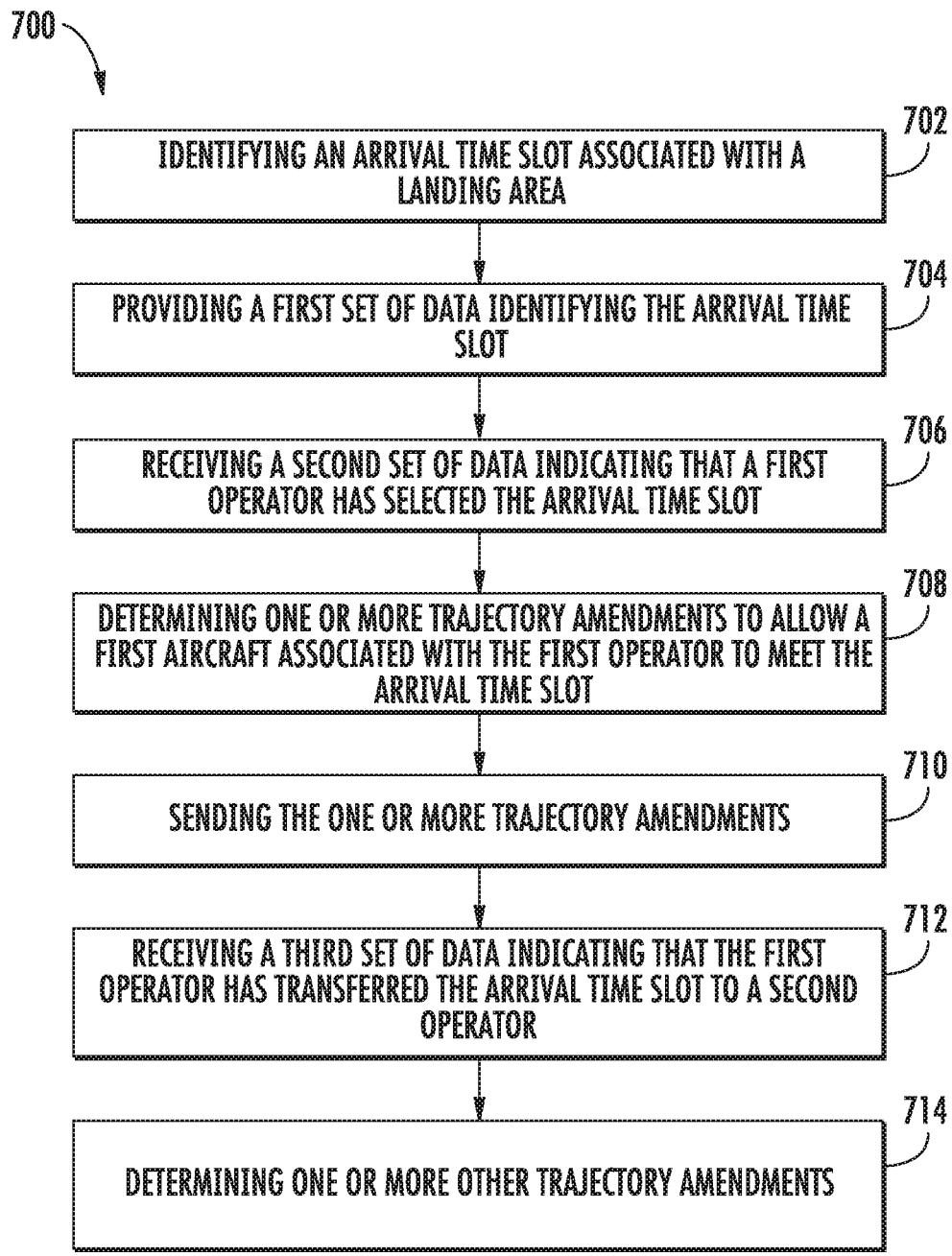
FIG. 7 depicts a flow diagram of an example method for providing trajectory amendments according to example embodiments of the present disclosure.

FIG. 7 depicts a flow diagram of an example method 700 for providing trajectory amendments according to example embodiments of the present disclosure. FIG. 7 can be implemented by one or more computing device(s), such as the computing device(s) depicted in FIGS. 5 and 8. One or more step(s) of the method 500 can be performed while one or more of the aircrafts 502A-B are in-flight. In addition, FIG. 7 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (702), the method 700 can include identifying an arrival time slot associated with a landing area. For instance, the computing device(s) 112 can identify an arrival time slot 604 associated with a landing area 606. As described herein, the computing device(s) 112 can identify the arrival time slot 604 by, for example, receiving a set of data 508 indicative of the arrival time slot 604 from the data sources 507.

At (704), the method 700 can include providing a first set of data identifying the arrival time slot. For example, the computing device(s) 112 can provide, to one or more second computing device(s) 506A-B of a plurality of operators, a first set of data 510 identifying the arrival time slot 604 (e.g., indicating that the arrival time slot 604 is available for purchase). The computing device(s) 112 can provide for display, in a user interface 600 associated with the computing device(s) 506A-B, the arrival time slot 604. The computing device(s) 506A-B can receive the first set of data 510 and display an output 602 that is indicative of the arrival time slot 604 and/or the landing area 606, as shown for example in FIG. 6. Each of the plurality of operators can be able to select (e.g., purchase) the arrival time slot 606 by, for example, submitting a bid to the one or more computing device(s) 112 (e.g., via the user interface 600). In the event that the first operator has a higher bid than the second operator, the first operator can select (e.g., purchase) the arrival time slot 604.

At (706), the method 700 can include receiving a second set of data indicating that a first operator has selected the arrival time slot. For example, if the first operator selects the arrival time slot 604 (e.g., via a winning bid), the computing device(s) 506A of the first operator can send a second set of data 512 indicating the selection of the arrival time slot 604 to the computing device(s) 112. The computing device(s) 112 can receive the second set of data 512 indicating that the first operator (of the plurality of operators) has selected the arrival time slot 604.

At (708), the method 700 can include determining one or more trajectory amendments to allow a first aircraft associated with the first operator to meet the arrival time slot. For instance, the computing device(s) 112 can determine one or more trajectory amendments 514A-B to allow a first aircraft 502A associated with the first operator to meet the arrival time slot 604 associated with the landing area 606. As described above, in some implementations, at least one of the trajectory amendments (e.g., 514A) can be associated with the first aircraft 502A of the first operator (e.g., that selected the arrival time slot 604). Such a trajectory amendment (e.g., 514A) can allow the first aircraft 502A to meet the arrival time slot 604. In some implementations, the trajectory amendments (e.g., 514B) can be associated with aircrafts (e.g., 502B) of one or more operators other than the first operator (e.g., the operators that did not select the arrival time slot 604). Such trajectory amendments (e.g., 514B) can allow the first aircraft 502A to meet the arrival time slot 604 by adjusting the trajectories of one or more other aircraft(s) (e.g., 502B) to avoid interfering with the first aircraft 502A meeting the arrival time slot 604.

At (710), the method 700 can include sending the one or more trajectory amendments. For instance, the computing device(s) 112 can send the one or more trajectory amendments 514A-B to one or more operators (e.g., computing device(s) 506A-B) of the plurality of operators. In this way, the operators can implement the trajectory amendments 514A-B to allow the first aircraft 502A to meet the arrival time slot 604. Additionally, and/or alternatively, the computing device(s) 12 can send the one or more trajectory amendments 514A-B to one or more of the aircrafts(s) 502A-B. In some implementations, the computing device(s) 112 can send the trajectory amendments 514A-B for approval, rejection, and/or promotion by a third party, as described above.

At (712), the method 700 can include receiving a third set of data indicating that the first operator has transferred the arrival time slot to a second operator. For example, the first operator can transfer the arrival time slot 604 to the second operator. The computing device(s) 506A-B of the first and/or second operators can be configured to send a third set of data 516 indicating that the first operator has transferred (e.g., sold, assigned, licensed, traded) the arrival time slot 604 to a second operator. The computing device(s) 112 can receive the third set of data 516 indicating that the first operator has transferred the arrival time slot 604 to a second operator. Moreover, at (714), when the arrival time slot 604 is transferred, the method 700 can include determining one or more other trajectory amendments. For instance, the computing device(s) 112 can determine one or more other trajectory amendments to allow a second aircraft 502B associated with the second operator to meet the arrival time slot 604 associated with the landing area 606.

Figure 8:
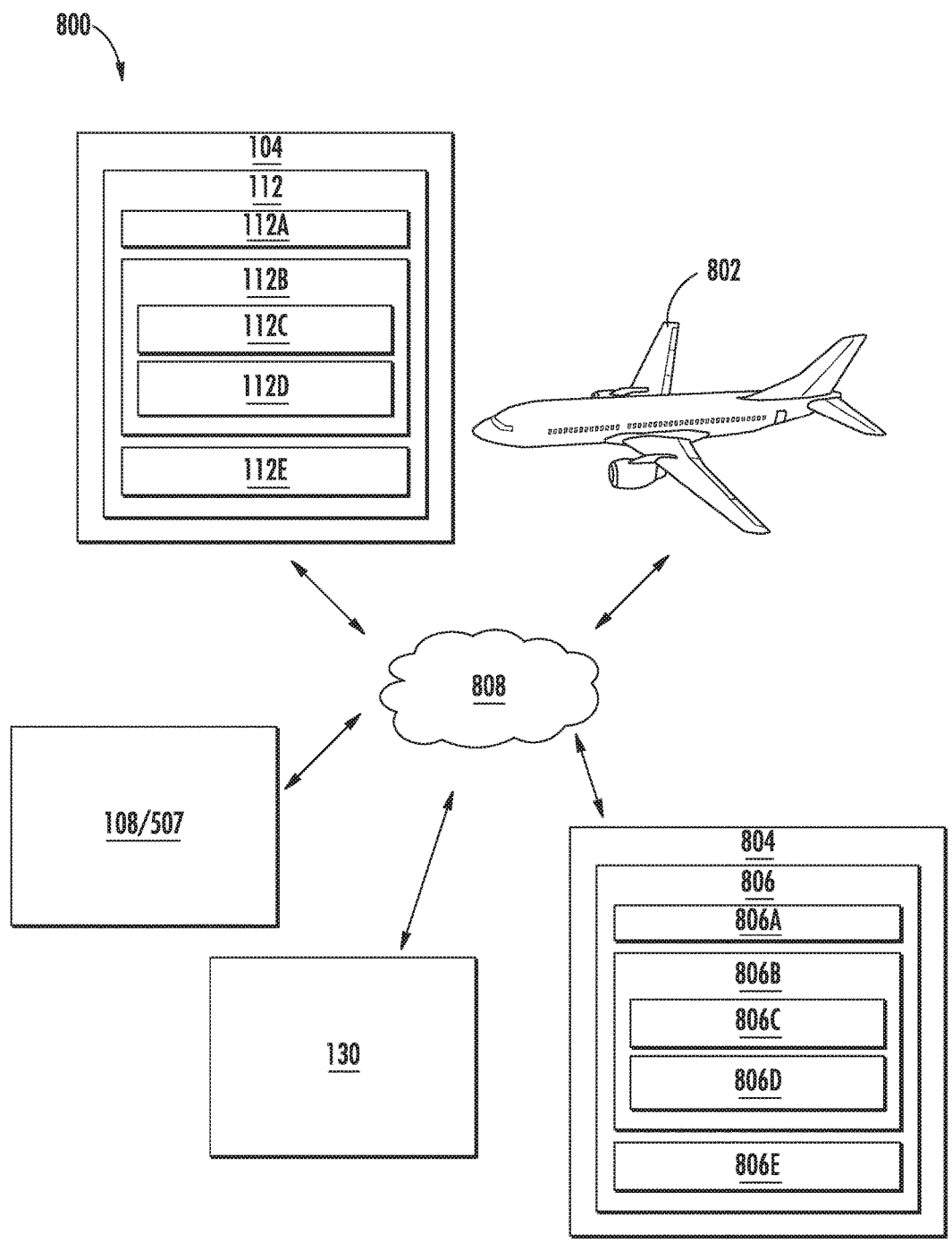
FIG. 8 depicts an example system according to example embodiments of the present disclosure.

FIG. 8 depicts an example system 800 according to example embodiments of the present disclosure. The system 800 can include the computing system 140, the data source(s) 108/507, the third party entity 130, one or more aircraft(s) 802, and/or one or more computing system(s) 804. The one or more aircraft(s) 802 can correspond to any of the aircrafts described herein (e.g., 102, 502A, 502B). The one or more computing system(s) 804 (and its components) can correspond to any of the computing systems associated with an operator described herein (e.g., 106, 504A, 504B). The computing system 104, the data source(s) 108/507, the third party entity 130, the one or more aircraft(s) 802, and/or the one or more computing system(s) 804 can be configured to communicate via one or more communications networks 808 (e.g., any suitable networks for transmission of the communications and/or data described herein).

The computing system 104 can include one or more computing device(s) 112. The computing device(s) 112 can include one or more processor(s) 112A and one or more memory device(s) 112B. The one or more processor(s) 112A can include any suitable processing device, such as a microprocessor, microcontroller, integrated circuit, logic device, and/or other suitable processing device. The one or more memory device(s) 112B can include one or more computer-readable media, including, but not limited to, non-transitory computer-readable media, RAM, ROM, hard drives, flash drives, and/or other memory devices.

The one or more memory device(s) 112B can store information accessible by the one or more processor(s) 112A, including computer-readable instructions 112C that can be executed by the one or more processor(s) 112A. The instructions 112C can be any set of instructions that when executed by the one or more processor(s) 112A, cause the one or more processor(s) 112A to perform operations. In some embodiments, the instructions 112C can be executed by the one or more processor(s) 112A to cause the one or more processor(s) 112A to perform operations, such as any of the operations and functions for which the computing system 104 and/or the computing device(s) 112 are configured, the operations for trajectory amendments (e.g., methods 400, 700), as described herein, and/or any other operations or functions of the one or more computing device(s) 112. The instructions 112C can be software written in any suitable programming language or can be implemented in hardware. Additionally, and/or alternatively, the instructions 112C can be executed in logically and/or virtually separate threads on processor(s) 112A.

The memory device(s) 112B can further store data 112D that can be accessed by the processors 117A. For example, the data 112D can include the sets of data, parameters, outputs, etc. shown and/or discussed with reference to FIGS. 1-7, data associated with the third party entity 130, data associated with one or more operators, and/or any other data and/or information described herein.

The computing device(s) 112 can also include a network interface 112E used to communicate, for example, with the other components of system 800 (e.g., via network(s) 808). The network interface 112E can include any suitable components for interfacing with one or more network(s), including for example, transmitters, receivers, ports, controllers, antennas, and/or other suitable components.

The computing system 804 can include one or more computing device(s) 806 that can correspond to the computing device(s) associated with the operators (e.g., 114, 506A, 506B). The computing device(s) 806 can include one or more processor(s) 806A and one or more memory device(s) 806B. The one or more processor(s) 806A can include any suitable processing device, such as a microprocessor, microcontroller, integrated circuit, logic device, and/or other suitable processing device. The one or more memory device(s) 806B can include one or more computer-readable media, including, but not limited to, non-transitory computer-readable media, RAM, ROM, hard drives, flash drives, and/or other memory devices.

The one or more memory device(s) 806B can store information accessible by the one or more processor(s) 806A, including computer-readable instructions 806C that can be executed by the one or more processor(s) 806A. The instructions 806C can be any set of instructions that when executed by the one or more processor(s) 806A, cause the one or more processor(s) 806A to perform operations. In some embodiments, the instructions 806C can be executed by the one or more processor(s) 806A to cause the one or more processor(s) 806A to perform operations, such as any of the operations and functions for which the computing systems 106, 504A, 504B and/or the computing device(s) 114, 506A, 506B are configured, the operations for trajectory amendments (e.g., methods 400, 700), as described herein, and/or any other operations or functions of one or more of the computing systems 106, 504A, 504B and/or the computing device(s) 114, 506A, 506B. The instructions 806C can be software written in any suitable programming language or can be implemented in hardware. Additionally, and/or alternatively, the instructions 806C can be executed in logically and/or virtually separate threads on processor(s) 806A.

The memory device(s) 806B can further store data 806D that can be accessed by the processors 806A. For example, the data 806D can include the sets of data, parameters, outputs, etc. shown and/or discussed with reference to FIGS. 1-7, data associated with one or more aircrafts, data associated with one or more operators, and/or any other data and/or information described herein.

The computing device(s) 806 can also include a network interface 806E used to communicate, for example, with the other components of system 800 (e.g., via network(s) 808). The network interface 806E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of providing trajectory amendments, comprising:
    identifying, by one or more first computing devices, an arrival time slot associated with a landing area;
    providing, by the one or more first computing devices to one or more second computing devices of a plurality of operators, a first set of data identifying the arrival time slot;
    receiving, by the one or more first computing devices, a second set of data indicating that a first operator of the plurality of operators has selected the arrival time slot; and
    determining in real-time, by the one or more first computing devices, one or more trajectory amendments to allow a first aircraft associated with the first operator to meet the arrival time slot associated with the landing area;
    determining, by the one or more first computing devices, a projected operations value associated with the one or more trajectory amendments; and
    sending, by the one or more first computing devices, the one or more trajectory amendments.

2. The computer-implemented method of claim 1, wherein sending, by the one or more computing devices, the one or more trajectory amendments comprises:
    sending, by the one or more computing devices, the one or more trajectory amendments to one or more operators of the plurality of operators.

3. The computer-implemented method of claim 1, wherein at least one of the trajectory amendments is associated with the first aircraft, and
   wherein a price associated with the one or more trajectory amendments is only viewable by the first operator of the plurality of operators.

4. The computer-implemented method of claim 3, wherein sending, by the one or more computing devices, the one or more trajectory amendments comprises:
   sending, by the one or more computing devices, the at least one trajectory amendment to the first aircraft associated with the first operator,
   wherein the at least one trajectory amendment is implementable by a flight management system, and
   wherein the price associated with the one or more trajectory amendments is based, at least in part, on the supply of trajectory amendments.

5. The computer-implemented method of claim 1, wherein the one or more trajectory amendments are associated with one or more aircrafts of one or more operators other than the first operator.

6. The computer-implemented method of claim 5, wherein sending, by the one or more computing devices, the one or more trajectory amendments comprises:
   sending, by the one or more computing devices, the one or more trajectory amendments to the one or more aircrafts of the one or more operators other than the first operator.

7. The computer-implemented method of claim 6, wherein each of the plurality of operators is able to select the arrival time slot by submitting a bid to the one or more first computing devices, and
   wherein selecting the arrival time slot further comprises purchasing the arrival time slot.

8. The computer-implemented method of claim 1, further comprising:
   receiving, by the one or more computing devices, a third set of data indicating that the first operator has transferred the arrival time slot to a second operator; and
   determining, by the one or more computing devices, one or more other trajectory amendments to allow a second aircraft associated with the second operator to meet the arrival time slot associated with the landing area.

9. The computer-implemented method of claim 1, wherein providing, by the one or more computing devices to one or more second computing devices of the plurality of operators, the first set of data identifying the arrival time slot comprises:
   providing for display, in a user interface presented on a display device, the arrival time slot.

10. The computer-implemented method of claim 9, wherein the arrival time slot is provided such that the arrival time slot can be selected via the user interface.

11. A computer-implemented method of providing trajectory amendments, comprising:
   identifying, by one or more first computing devices, an arrival time slot associated with a landing area;
   providing, by the one or more first computing devices to one or more second computing devices of a plurality of operators, a first set of data identifying the arrival time slot;
   receiving, by the one or more first computing devices, a second set of data indicating that a first operator of the plurality of operators has selected the arrival time slot; and
   determining in real-time, by the one or more first computing devices, one or more trajectory amendments to allow a first aircraft associated with the first operator to meet the arrival time slot associated with the landing area;
   determining, by the one or more first computing devices, a projected operations value for the one or more trajectory amendments; and
   sending the one or more trajectory amendments to one or more operators of the plurality of operators.

12. The system of claim 11, wherein the trajectory amendments are associated with aircrafts of one or more operators other than the first operator.

13. The system of claim 11, wherein at least one of the trajectory amendments is associated with the first aircraft.

14. The system of claim 11, wherein the arrival time slot is provided such that the arrival time slot can be selected via the user interface.

15. The system of claim 11, wherein each of the plurality of operators is able to purchase the arrival time slot by submitting a bid to the one or more first computing devices via interaction with the user interface.

16. The system of claim 11, further comprising:
   receiving a third set of data indicating that the first operator has transferred the arrival time slot to a second operator; and
   determining one or more other trajectory amendments to allow a second aircraft associated with the second operator to meet the arrival time slot associated with the landing area,
   wherein the third set of data is displayed via a user interface to the second operator, and
   wherein each of the plurality of operators is able to sell the arrival time slot by submitting a bid to the one or more first computing devices via interaction with the user interface.

17. A computing system for providing trajectory amendments, the system comprising one or more processors and one or more memory devices, the one or more memory devices storing instructions that when executed by the one or more processors cause the one or more processors to perform operations, the operations comprising:
   identifying an arrival time slot associated with a landing area;
   providing, to one or more second computing devices of a plurality of operators, a first set of data identifying the arrival time slot;
   receiving a second set of data indicating that a first operator of the plurality of operators has selected the arrival time slot;
   determining one or more trajectory amendments in real-time to allow a first aircraft associated with the first operator to meet the arrival time slot associated with the landing area;
   determining, by the one or more first computing devices, a projected operations value associated with the one or more trajectory amendments;
   receiving a set of data indicating that a third party entity has accepted the one or more trajectory amendments; and
   responsive to receiving the set of data indicating that a third party has accepted the one or more trajectory amendments, sending the one or more trajectory amendments to one or more operators of the plurality of operators.

18. The system of claim 17, wherein the set of data indicating that the third party entity has accepted the one or more trajectory amendments further comprises an indication that the third party promotes the one or more trajectory amendment, the system further comprising an interactive element, the interactive element being used by at least one operator of the plurality of operators to select the one or more trajectory.

19. The system of claim 18, wherein sending the one or more trajectory amendments to one or more operators of the plurality of operators comprises:

sending a set of data indicating the one or more trajectory amendments and an indication of a promotion by the third party entity to one or more operators of the plurality of operators, wherein the third party entity subsidizes the price of the one or more trajectory amendments, and wherein the interactive element comprises a button.

20. The computer-implemented method of claim 1, wherein the projected operations value includes at least one of a fuel savings value, a noise savings value, an emission savings value, a time savings value, and a turbulence savings value.

* * * * *